Feb. 11, 1958  J. D. PADGETT  2,822,736
SCALE ACTUATOR FOR VACUUM PRINTING FRAME
Filed July 29, 1955
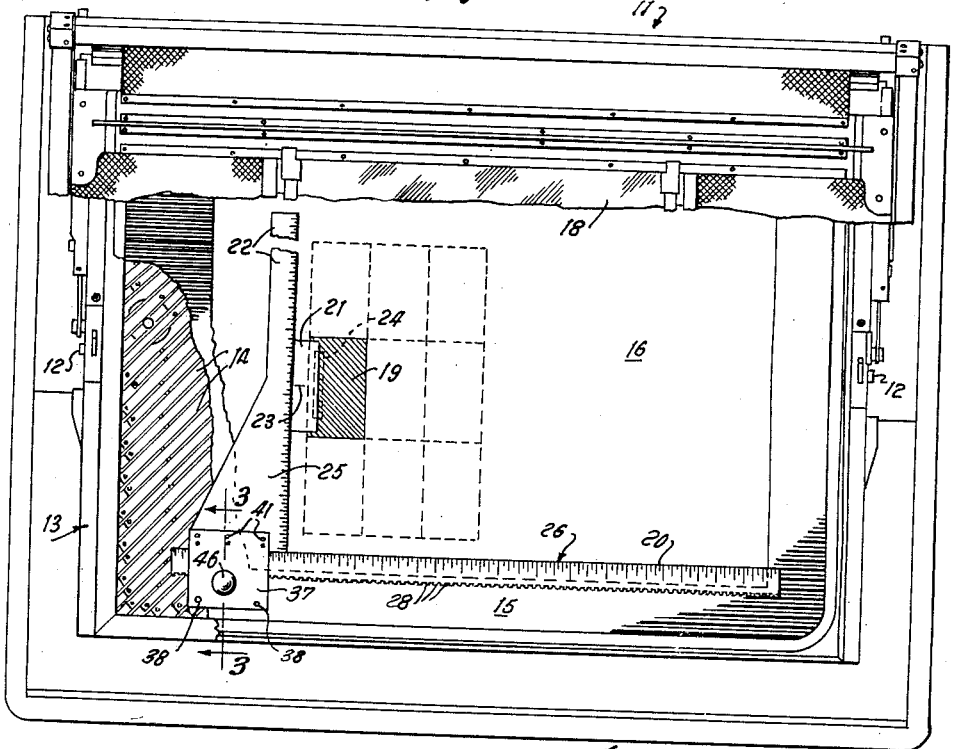
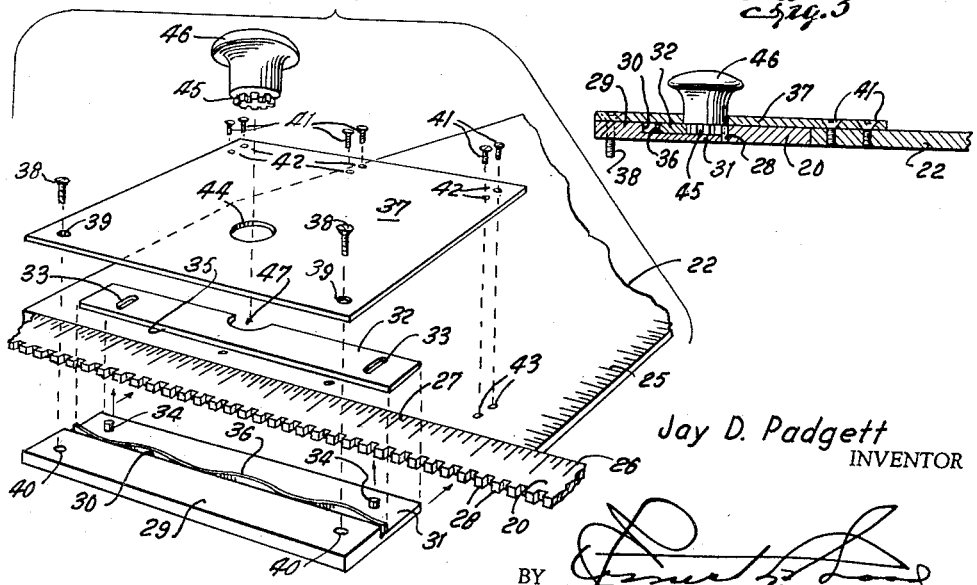
Jay D. Padgett
INVENTOR
BY
ATTORNEY

United States Patent Office 2,822,736
Patented Feb. 11, 1958

2,822,736

SCALE ACTUATOR FOR VACUUM PRINTING FRAME

Jay D. Padgett, Dallas, Tex.

Application July 29, 1955, Serial No. 525,321

6 Claims. (Cl. 95—77)

This invention relates to photocomposing machines and more particularly to devices for aligning and positioning images to be transferred from a negative to the sensitized plate in step and repeat printing on vacuum printing frames.

The present invention is used in conjunction with the photocomposing machine described in U. S. Letters Patent No. 2,713,294, issued to Jay D. Padgett July 19, 1955, wherein scale members and a negative holder of ferrous metal are magnetically held in registered relationship with each other and with the sensitized plate by a magnetic field underlying the rubber make-up mat so that their positions will remain unchanged while creating a vacuum in the vacuum frame to bring the negative and plate into intimate contact with the glass cover of the frame preliminary to exposing the same to light. It is desirable, to insure against distortion, that the work be devoid of any prominences which would prevent flush contact of the negative and plate with the glass cover of the frame. When the scale members or negative holders or both are magnetically retained, it is difficult to shift the longitudinal scale member, especially minute distances to insure the necessary precision adjustment of the negative in relation to the sensitized plate. It is desirable, therefore, to provide detachable means for effecting longitudinal displacement of at least one of the scale members in such manner as to easily control its displacement for precision setting.

It is therefore the principal object of the invention to provide a device for accurately positioning scale members and negative holders in relation to each other and to a sensitized plate in a photocomposing machine.

Another object is to provide a device of the character set forth in combination with the magnetic base for the make-up mat of a vacuum printing frame.

Briefly, the invention consists of a calibrated longitudinal flat bar or scale member having teeth formed in its lower edge, whose opposite smooth edge is abutted by the lower end of a transverse scale member whose calibrations determine the placement of a negative holder in relation thereto and consequently the negative in relation to the sensitized plate on which the negative is superimposed. A retainer plate joins the scale members in their described relationship so that the longitudinal scale member may be shifted longitudinally by means of a pinion insertable through a hole in the retainer plate to engage the teeth of the longitudinal scale member to shift the same longitudinally through the medium of a knob attached to the pinion, the latter being removable to permit closing of the transparent cover of the printing frame after all adjustments are made.

Other and lesser objects will become manifest as the description proceeds when considered in connection with the annexed drawing therein:

Figure 1 is a top plan view of a vacuum printing frame with parts broken away to show the magnet bed below the work surface and showing thereon the sensitized plate, negative and the positioning elements.

Figure 2 is an exploded view in top perspective in which the scale members are fragmentarily shown, and Figure 3 is a fragmentary sectional view taken on line 3—3 of Figure 1.

The structure of Figure 1 can be better understood by referring to the above identified patent. In this figure, reference numeral 10 denotes generally the cabinet of the printing machine in which the printing frame, broadly designated by reference numeral 11, is tiltable from a slightly inclined position to a vertical position for printing on pivot pins 12. A magnet bed, generally indicated by reference numeral 13, is suitably supported in the printing frame 11 and carries a multiplicity of permanent magnets 14 which are arranged in end to end relationship in rows extending diagonally across the bed, as shown, and held for limited movement perpendicular to the plane of the bed.

A rubber blanket 15 lies flush against the magnets and it is upon this blanket that the sensitized plate 16 is placed. The printing frame 11 has a cover frame 17 hinged thereto along its rear edge and lockable to the printing frame at its front corners (not shown). The cover frame has a glass panel 18 and when closed on the printing frame defines an air-tight compartment in which is drawn a partial vacuum to cause the blanket 15 to be influenced upwardly, pressing the negative 19, in close union with the plate 16, firmly against the glass 18. It is therefore necessary, to insure against wrinkles and shadows that the elements used to position the negative 19 and plate 16 be as flat or thin as possible and that the means for holding these elements leave no prominences which would interfere with flush engagement of the negative and plate with the glass 18.

In preparing the machine for printing, a calibrated rule bar 20, negative holder 21 and a scale bar 22 are employed. These elements may all be made of ferrous metal, preferably of high grade steel. It may be desirable that only the negative holder 21 be made of ferrous metal to be attracted and held by the magnets 14 in adjusted positions.

The initial step of laying out the work may be accomplished on a light table or other flat surface and transferred to the blanket 15 of the machine for alignment on the sensitized printing plate 16. The scale members 20 and 22 or at least the negative holder 21 will be strongly attracted by the magnetic field created by the magnets 14 over which the work is placed for printing.

It is first necessary to position the negative 19 accurately with respect to the scale bar 22 or its equivalent, after which the negative holder 21, which is simply a thin flat rectangular strip of ferrous metal, is located with respect to the scale bar 22 by means of a single line 23 midway of its ends and which is brought into proper register with the calibrations on the scale bar 22. The negative is secured to the negative holder 21 by means of a strip 24 of adhesive material which is applied to the undersurface of the negative and negative holder.

The foregoing relates to elements fully illustrated and described in the foresaid patent. The invention will now be described.

The lower end 25 of the scale bar or transverse scale 22 is made much wider than the upper portion thereof to afford a wider bearing surface for the longitudinal scale bar 20 whose smooth edge 26 slides against the corresponding smooth lower edge 27 (Figure 2) of the widened base 25 of the scale member 22. The opposite edge of the longitudinal scale bar 20 is provided with a coextensive row of teeth 28.

A bearing plate 29 is longitudinally recessed to define a coextensive shoulder 30 and a ledge 31 on which rests a floating bar 32. This bar 32 is made movable laterally in relation to the shoulder 30 by virtue of transverse, longitudinally spaced slots 33 therein through which extend registering studs 34 rising from the ledge 31 of the bearing plate 29 and whose height is equal to the thickness of the floating bar 32. Interposed between the shoulder 30 and the confronting edge 35 of the floating bar 32 is a length of corrugated flat spring steel 36 which resists movement of the bar 32 toward the shoulder 30 for the purpose to be presently explained.

Overlying the bearing plate 29, the floating bar 32 and the scale member 20 which slides between the edge of the ledge 31 and the lower edge 27 of the scale member 22, is a retainer plate 37 which is substantially square in shape. The retainer plate 37 and bearing plate 29 are secured to the base of the magnet bed 13 by screws 38, extending through holes 39 in the retainer plate 37 and holes 40 in the bearing plate 29 and into threaded holes, not shown, in the magnet base. The opposite edge of the retainer plate 37 is secured to the widened lower portion 25 of the scale bar 22 by screws 41 passing through holes 42 in the retainer plate and are threaded in holes 43 in the widened portion 25 of the scale member 22.

The retainer plate 37 has a hole 44 therein into which is passed a pinion 45, carrying a handle or operating knob 46. The floating bar 32 has a recess 47 accommodating the pinion 45 in its operative position in engagement with the teeth 28 of the scale member 20.

To assemble the described parts, the bearing plate is first positioned as shown and the floating bar 32 is placed against the spring 36. The scale bar 20 is then placed with its toothed edge against the recessed edge of the floating bar 32. The scale bar 22 is then disposed with the edge 27 against the smooth edge 26 of the longitudinal scale bar 20, whereupon the retainer plate 37 is positioned over the longitudinal bar 20 to register its holes 39 with the holes 40 of the bearing or mounting plate 29. The screws 38 are then inserted into the matching holes 39 and 40. In order to bring the holes 42 of the retainer plate 37 into register with the holes 43 in the widened end 25 of the scale bar 22, the latter must be thrust against the longitudinal scale bar 20 to overcome the resistance of the spring 36 through the floating bar 32, after which the screws 41 are inserted into the now matching holes 42 and 43. Resistance of the spring 36 maintains frictional contact of the floating bar 32 with the longitudinal scale bar 20 and between the latter and the edge 27 of the widened end 25 so that the scale bar 20 will not move except when urged in a longitudinal direction as by rotating the pinion 45 by its knob 46 which insures fineness of adjustment as compared with efforts to accomplish such adjustment entirely with the hands. Surface friction on the underside of the scale member 20, especially when the surface is rubber, prevents precise movement of the longitudinal scale member 20 except by the means shown and described.

When proper adjustment of the scale member 20 has been made, the pinion 45 is removed so that no projection remains above the common plane of the retaining elements which would prevent flush contact of the work with the glass 18 when the cover is closed on the printing frame preparatory to exposing the work to light in the usual prescribed manner.

Manifestly, the construction as shown and described is capable of some modification and such modification as may be construed to fall within the scope and meaning of the appended claims is also considered to be within the spirit and intent of the invention.

What is claimed is:

1. In combination with the make-up mat and transparent cover of a photocomposing machine, means for positioning a negative in relation to a sensitized plate on said make-up mat comprising a negative holder, transverse scale member to which said negative holder is detachably secured, a longitudinal scale member, means including a retainer plate for holding said longitudinal scale member yieldably and slidably against an end of said transverse scale member and means extending through a hole in said retainer plate and engageable with said longitudinal scale member for adjusting the same in a plane at right angles to the plane of said transverse scale member, said adjusting means being removable to permit close union of said make-up mat and said cover in closed position of the latter.

2. In combination with the make-up mat and transparent cover of a photocomposing machine, means for positioning a negative in relation to a sensitized plate on said make-up mat comprising a longtiudinal scale member and a transverse scale member perpendicular to said longitudinal scale member and to which said negative is attached in overlying relation to said sensitized plate, means including a retainer plate for holding said longitudinal scale member in yieldable sliding engagement with an end of said transverse scale member and means extending through an aperture in said retainer plate and engaging said longitudinal scale member for moving the same in a plane at right angles to the plane of said transverse scale member, said scale member moving means being removable to permit flush relationship between said make-up mat and said cover in closed position of the latter.

3. The structure of claim 2 wherein one edge of said longitudinal scale member is formed with teeth, said removable means comprising a pinion engaging said teeth and rotatable to effect longitudinal movement of said longitudinal scale member.

4. In combination with the make-up mat and cover of a photocomposing machine, a means for positioning a negative in relation to a sensitized plate on said make-up mat comprising a longitudinal scale member overlying the lower edge of said sensitized plate, a transverse scale member perpendicular to said longitudinal scale member to which said negative is attached, means holding said longitudinal scale member to dispose one of its edges in longitudinal sliding engagement with the lower end of said transverse scale member and means engaging the opposite edge of said longitudinal scale member for moving the same longitudinally, said means comprising a pinion carrying an operating knob, said pinion engaging in a row of teeth in and coextensive with one edge of said longitudinal scale member, said operating knob being removable to permit flush engagement of said make-up mat and said cover in closed position of the latter.

5. In combination with the make-up mat and transparent cover of a photocomposing machine, means for positioning a negative in relation to a sensitized plate on said make-up mat comprising a longitudinal scale member and a transverse scale member perpendicular to said longitudinal scale member and to which said negative is attached in overlying relation to said sensitized plate, a mounting plate recessed to define a longitudinally coextensive shoulder and a ledge, a spring steel corrugated strip lying against said shoulder and a floating bar supported on said ledge for limited lateral displacement under the resistance of said strip and against which the toothed edge of said longitudinal scale member is adapted to slidably engage and means insertable through an aperture in said retainer plate and engaging said longitudinal scale member for moving the same in a plane at right angles to the plane of said transverse scale member.

6. In combination with the printing frame of a photocomposing machine, a means for positioning a negative in relation to a sensitized plate on said printing frame comprising a longitudinal scale member overlying the lower edge of said sensitized plate, a transverse scale member perpendicular to said longitudinal scale member to which said negative is attached, means holding said longitudinal scale member to dispose one of its edges in longitudinal sliding engagement with the lower end of said transverse scale member, said holding means comprising a bearing plate having a longitudinal recess defining a longitudinally coextensive shoulder and ledge, a bar on said ledge movable laterally in relation to said shoulder and against which one edge of said longitudinal scale member slidably engages and means interposed between said shoulder and the opposite edge of said bar for biasing the latter against said longitudinal scale member.

References Cited in the file of this patent

UNITED STATES PATENTS

| | | |
|---|---|---|
| 1,923,671 | Huebner | Aug. 22, 1933 |
| 2,713,294 | Padgett | July 19, 1955 |